US007779031B2

(12) United States Patent
Grosset et al.

(10) Patent No.: US 7,779,031 B2
(45) Date of Patent: Aug. 17, 2010

(54) MULTIDIMENSIONAL QUERY SIMPLIFICATION USING DATA ACCESS SERVICE HAVING LOCAL CALCULATION ENGINE

(75) Inventors: Robin Grosset, Ottawa (CA); David Hood, London (GB); Joachim Limburg, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 453 days.

(21) Appl. No.: 11/675,320

(22) Filed: Feb. 15, 2007

(65) Prior Publication Data
US 2008/0201293 A1 Aug. 21, 2008

(51) Int. Cl.
*G06F 17/30* (2006.01)
(52) U.S. Cl. ............... 707/770; 707/720; 707/755; 707/756; 715/255
(58) Field of Classification Search ......... 707/720, 707/755, 756, 770; 715/255
See application file for complete search history.

(56) References Cited

U.S. PATENT DOCUMENTS

| | | | |
|---|---|---|---|
| 5,832,475 A | 11/1998 | Agrawal et al. | |
| 5,918,232 A | 6/1999 | Pouschine et al. | |
| 6,275,818 B1 | 8/2001 | Subramanian et al. | |
| 6,473,750 B1 * | 10/2002 | Petculescu et al. | 707/3 |
| 6,493,718 B1 * | 12/2002 | Petculescu et al. | 707/102 |
| 6,609,123 B1 | 8/2003 | Cazemier et al. | |
| 6,651,055 B1 * | 11/2003 | Kilmer et al. | 707/3 |
| 6,728,697 B2 | 4/2004 | Leathers | |
| 6,732,091 B1 | 5/2004 | Middelfart | |
| 6,750,864 B1 | 6/2004 | Anwar | |
| 6,898,603 B1 | 5/2005 | Petculescu et al. | |
| 6,985,895 B2 | 1/2006 | Witkowski et al. | |
| 7,080,062 B1 | 7/2006 | Leung et al. | |
| 7,089,266 B2 * | 8/2006 | Stolte et al. | |
| 7,222,130 B1 * | 5/2007 | Cras et al. | |
| 7,328,206 B2 * | 2/2008 | Petculescu et al. | |
| 7,337,163 B1 * | 2/2008 | Srinivasan et al. | |
| 7,337,170 B2 * | 2/2008 | Lee et al. | |
| 7,363,287 B2 * | 4/2008 | Kilmer et al. | |
| 7,392,242 B1 * | 6/2008 | Baccash et al. | |
| 2002/0087524 A1 | 7/2002 | Leathers | |
| 2005/0010565 A1 | 1/2005 | Cushing et al. | |
| 2006/0020933 A1 | 1/2006 | Pasumansky et al. | |
| 2006/0294076 A1 * | 12/2006 | Mordvinov et al. | 707/3 |
| 2006/0294087 A1 | 12/2006 | Mordvinov | |
| 2007/0088689 A1 * | 4/2007 | Cras et al. | 707/4 |
| 2007/0198471 A1 * | 8/2007 | Schneider et al. | 707/3 |

OTHER PUBLICATIONS

William E. Pearson, III, "Optimizing Microsoft SQL Server Analysis Services: MDX Optimization Techniques: Introduction and the Role of Processing", Apr. 5, 2004.*

(Continued)

*Primary Examiner*—Apu M Mofiz
*Assistant Examiner*—Hung D Le
(74) *Attorney, Agent, or Firm*—Shumaker & Sieffert, P.A.

(57) ABSTRACT

An enterprise business intelligence system includes a data access service that provides consistent availability of functionality for querying multidimensional data sources regardless of the capabilities of the underlying data sources. The data access service disassembles a multidimensional query into execution units, and may optimize the multidimensional query such that individual execution units may be executed locally or remotely to achieve increase computational efficiently.

17 Claims, 7 Drawing Sheets

OTHER PUBLICATIONS

International Search Report and Written Opinion from Corresponding PCT Application Serial No. PCT/US08/00901 dated Jun. 19, 2008 (9 pages).

International Preliminary Report on Patentability from corresponding PCT Application Serial No. PCT/US2008/000901 mailed Aug. 27, 2009 (8 pages).

* cited by examiner

MULTIDIMENSIONAL QUERY SIMPLIFICATION USING DATA ACCESS SERVICE HAVING LOCAL CALCULATION ENGINE

TECHNICAL FIELD

The invention relates to the querying of multidimensional data, and more particularly, to querying multidimensional data in enterprise software systems.

BACKGROUND

Enterprise software systems are typically sophisticated, large-scale systems that support many, e.g., hundreds or thousands, of concurrent users. Examples of enterprise software systems include financial planning systems, budget planning systems, order management systems, inventory management systems, sales force management systems, business intelligence tools, enterprise reporting tools, project and resource management systems and other enterprise software systems.

Many enterprise performance management and business planning applications require a large base of users to enter data that the software then accumulates into higher level areas of responsibility in the organization. Moreover, once data has been entered, it must be retrieved to be utilized. The system may perform mathematical calculations on the data, combining data submitted by one user with data submitted by another. Using the results of these calculations, the system may generate reports for review by higher management. Often these complex systems make use of multidimensional data sources that organize and manipulate the tremendous volume of data using data structures referred to as data cubes. Each data cube, for example, includes a plurality of hierarchical dimensions having levels and members for storing the multidimensional data.

In recent years vendors of multidimensional data sources for use in enterprise software systems have increasingly adopted the Multidimensional Expression query language ("MDX") as a platform for interfacing with the data sources. In particular, MDX is a structured query language that software applications utilize to formulate complex queries for retrieving and manipulating the data stored within the multidimensional data sources. . . .

Over time the sophistication of the MDX query processors implemented within the multidimensional data sources has improved and the query language itself has incorporated new constructs. As a result, currently different data source vendors implement their own MDX query processors which exhibit different characteristics from those of other vendors. Thus, the level of MDX support and functionality varies by data source. These differences make heterogeneous MDX query generation very difficult within large enterprise software systems wishing to efficiently utilize multiple MDX data sources from different vendors.

As a result of these differing MDX implementations, it is generally the case that software applications which query different MDX data sources will only present analysis features which are available in the underlying system, disabling any feature which is not supported by the data source vendor. Therefore, in order to be consistent across several different data sources, the enterprise software applications generally present the lowest common denominator in terms of functionality of the MDX data sources within the enterprise system. As a result, a user's experience with the enterprise software system is often sacrificed in that all of the datasets are presented as implementing a limited, basic set of MDX features.

SUMMARY

In general, the invention is directed to techniques that enable consistent and efficient access to multidimensional data sources which support a querying language in varying degrees. As one example, the techniques allow an enterprise software system to present a consistent and sophisticated set of Multidimensional Expression ("MDX") features with respect to any underlying multidimensional data source supporting MDX regardless of the degree that the underlying data source implements the MDX features.

For example, according to the techniques, an enterprise business intelligence software system includes a data access service that provides a logical interface to a plurality of multidimensional data sources. The data access service may, for example, execute on application server intermediate to the software applications and the underlying data sources. The data access service permits the enterprise software applications to issue complex MDX queries to multidimensional data sources without regard to particular MDX features implemented by each of the underlying data sources. If a given underlying data source does not support a particular MDX function, for example, the data access service may emulate the unsupported function by issuing one or more MDX queries to the multidimensional data source to retrieve raw multidimensional data, performing the MDX function locally on the raw data, and returning a resultant multidimensional data set to the requesting software application. In this manner, the data access service hides the vendor-specific MDX implementations of the underlying multidimensional data sources.

The data access service may also permit optimization of a query. As one example, the data access service may disassemble an MDX query received from an enterprise software application into a plurality of constituent execution units. These execution units may be embodied in the nodes of a run tree. The data access service then determines whether the individual execution units are more efficiently processed locally, i.e., within the context of the data access service, or remotely, i.e., by the target multidimensional data source. The data access service may make such costing decisions based on control information that describes the characteristics of each of the data sources within the enterprise system. Using the control information, the data access service is able to associate local and remote cost information with each of the constituent execution units of the MDX query. The cost information may be defined, for example, in terms of volume of data necessary to complete the operation, processing operations, or other parameters.

In addition, the data access service may make costing decisions regarding local or remote execution of the query execution units based on empirical information gathered in realtime from past interaction with the data sources. For example, during execution, the data access service may determine that a particular multidimensional data source is low on available memory when a software application has issued a memory-intensive MDX query. Instead of making a remote query request, the system may retrieve the raw data necessary to perform the query from the data source and locally emulate the execution of the query.

Furthermore, based on the characteristics of the enterprise multidimensional data, the data access service may rewrite a complex MDX query to a much simpler query that returns the same data but that will take less processing time and/or consume less memory during execution. Thus, even though a data source may support a particular query function, the data access service may optimize each query to realize the most efficient allocation of resources possible.

In one embodiment, a method comprises receiving a multidimensional data source query, parsing the query into a sequence of one or more multidimensional queries, determining whether the queries should be executed remotely or locally, and executing the queries.

In another embodiment, a method is described for querying multidimensional data sources that enables the system to query multidimensional data sources consistently and efficiently. The query from the user is first parsed by a multidimensional query parser which may form a parse tree. This parse tree may be made up of one or more queries which holistically form the query from the user. The parse tree may be analyzed by a planner to determine whether the queries forming the parse tree can and should be executed locally or remotely. The result of the parse tree, which may be a run tree, may then be analyzed by an execution engine. During execution of the data source queries, the execution engine may analyze the performance resulting from executing the run tree and make variations to the decisions proposed by the query planner as to whether a given query should be performed locally or remotely.

In another embodiment, a computing system comprises an enterprise software application that issues a multidimensional query in accordance with a multidimensional query language specifying a set of multidimensional operations. The system also includes a plurality of multidimensional data sources having different implementations of the set of multidimensional operations, and a data access service executing on a computing environment between the enterprise software application and the plurality of multidimensional data sources. The data access service includes: a multidimensional calculation engine, a query parser, a query planner and query execution engine. The query parser parses the multidimensional query into a plurality of execution units with the data access service, wherein the execution units specify multidimensional operations. The query planner designates each of the execution unit for either remote execution by a target one of the multidimensional data sources or locally by the data access service based on whether the implementation of the set of features of the target multidimensional data source supports any multidimensional operation specified by the execution unit. The query execution engine executes each of the multidimensional execution units locally with a multidimensional calculation engine within the data access service or within the target data source based on the designation specified by the query planner and a determination whether the multidimensional calculation engine of the data access service is likely to locally perform the multidimensional operation more efficiently than the target multidimensional data source.

In another embodiment, a computer-readable storage medium comprises instructions which cause a programmable processor to perform the methods described herein.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
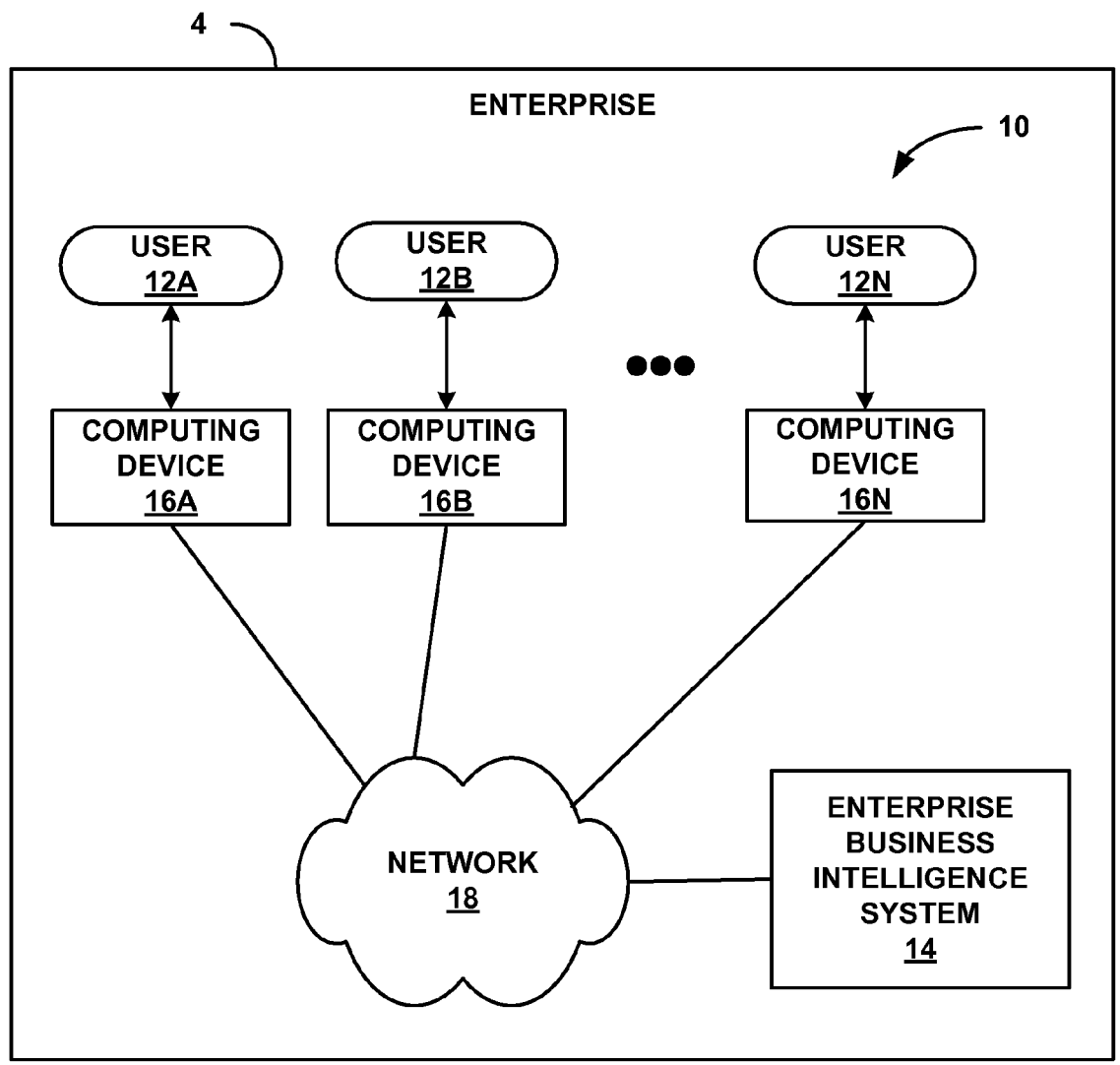
FIG. 1 is a block diagram illustrating an example enterprise having a computing environment in which a plurality of users interacts with an enterprise business intelligence system.

FIG. 1 is a block illustrating an example enterprise 4 having a computing environment 10 in which a plurality of users 12A-12N (collectively, "users 12") interact with an enterprise business intelligence system 14. In the system shown in FIG. 1, enterprise business intelligence system 14 is communicatively coupled to a number of computing devices 16A-16N (collectively, "computing devices 16") by a network 18. Users 12 interact with their respective computing devices to access enterprise business intelligence system 14.

For exemplary purposes, the invention is described in reference to an enterprise business intelligence system, such as an enterprise financial or budget planning system. The techniques described herein may be readily applied to other software systems, including other large-scale enterprise software systems. Examples of enterprise software systems include order management systems, inventory management systems, sales force management systems, business intelligent tools, enterprise reporting tools, project and resource management systems and other enterprise software systems.

Typically, users 12 view and manipulate multidimensional data via their respective computing devices 16. The data is "multidimensional" in that each multidimensional data element is defined by a plurality of different object types, where each object is associated with a different dimension. Users 12 may, for example, retrieve data related to store sales by entering a name of the salesman, a store identifier, a date, and a product sold, as well as, the price at which the product was sold, into their respective computing devices 16.

Enterprise users 12 may utilize a variety of computing devices to interact with enterprise business intelligence system 14 via network 18. For example, an enterprise user may interact with enterprise business intelligence system 14 using a laptop computer, desktop computer, or the like, running a web browser, such as Internet Explorer™ from Microsoft Corporation of Redmond, Wash. Alternatively, an enterprise user may use a personal digital assistant (PDA), such as a Palm™ organizer from Palm Inc. of Santa Clara, Calif., a web-enabled cellular phone, or similar device.

Network 18 represents any communication network, such as a packet-based digital network like a private corporate network or a public network like the Internet. In this manner, computing environment 10 can readily scale to suit large enterprises. Enterprise users 12 may directly access enterprise business intelligence system 14 via a local area network, or may remotely access enterprise business intelligence system 14 via a virtual private network, remote dial-up, or similar remote access communication mechanism.

In one example implementation, enterprise business intelligence system 14 is implemented in accordance with a three-tier architecture: (1) one or more web servers that provide user interface functions; (2) one or more application servers that provide an operating environment for enterprise software applications and business logic; (3) and one or more multidimensional data sources. The multidimensional data sources may be implemented using a variety of vendor platforms, and may be distributed throughout the enterprise. As one example, the multidimensional data sources may be databases configured for Online Analytical Processing ("OLAP"). As another example, the multidimensional data sources may be configured to receive and execute Multidimensional Expression ("MDX") queries of some arbitrary level of complexity.

Figure 2:
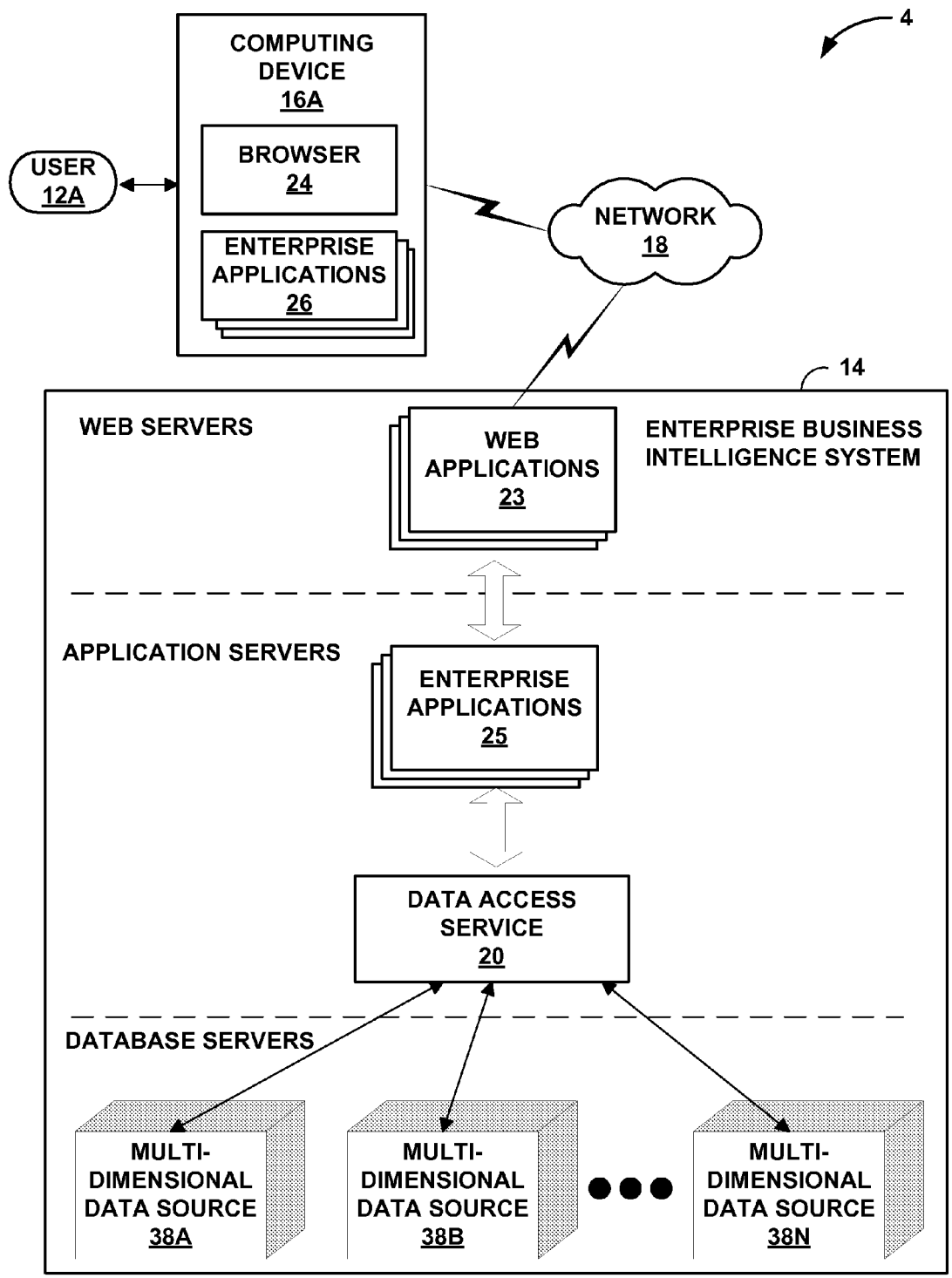
FIG. 2 is a block diagram illustrating one embodiment of an enterprise business intelligence system.

As described in further detail below, the enterprise software applications issue complex queries according to a structured multidimensional query language, such as MDX. Enterprise business intelligence system 14 includes a data access service that provides a logical interface to the multidimensional data sources. The data access service may, for example, execute on the application servers intermediate to the software applications and the underlying data sources. The data access service permits the enterprise software applications to issue complex MDX queries to multidimensional data sources without regard to particular MDX features implemented by each of the underlying data sources. If a given underlying data source does not support a particular MDX function, for example, the data access service may emulate the unsupported function by issuing one or more MDX queries to the multidimensional data source to retrieve raw multidimensional data, performing the MDX function locally on the raw data, and returning a resultant multidimensional data set to the requesting software application. In this manner, the data access service hides the vendor-specific MDX implementations of the underlying multidimensional data sources. Enterprise business intelligence system 14 is therefore capable of providing a consistent set of query functions regardless of the capabilities of the underlying data sources. That is, the data access service of enterprise business intelligence system 14 ensures that the superset of all multidimensional queries is supported regardless of the level of support provided by the underlying data sources. In the case that enterprise business intelligence system 14 includes a plurality of data sources (as depicted in FIG. 2, illustrating multiple data sources 38), enterprise business intelligence system 14 ensures consistent functionality over all data sources.

Enterprise business intelligence system 14 is also capable of optimizing the performance of multidimensional data source queries. As one example, the data access service disassembles an MDX query received from an enterprise software application into a plurality of constituent execution units. In one embodiment, the data access service may parse the MDX query, forming an abstract syntax tree referred to herein as a parse tree, then form a run tree as the output of a query execution planning process on the abstract syntax tree. As described in detail below, the result of the query planning process is the run tree and its arrangement of run tree nodes. Each run-tree node represents a single action (also referred to herein as an execution unit) to be performed with respect to the execution of the overall MDX query. These constituent run-tree nodes may specify expressions for evaluation, multidimensional operations, access requests to retrieve multidimensional data items, or other actions. The individual constituent run-tree nodes may be viewed as MDX query components.

The data access service then determines whether the individual run-tree nodes are more efficiently processed locally, i.e., within the context of the data access service on the application server(s), or remotely, i.e., by the MDX processors provided by the computing environment of the target multidimensional data source. The term "remote," therefore, need not necessarily be limited to data sources physically positioned at different locations from the data access service.

The data access service may make such costing decisions based on control information that describes the characteristics of each of the data sources within the enterprise system. Using the control information, the data access service is able to associate local and remote cost information with each of the constituent run-tree nodes of the MDX query. The cost information may be defined, for example, in terms of volume of data necessary to complete the operation, processing operations, or other parameters.

In addition, the data access service may make costing decisions regarding local or remote execution of the query runtree nodes based on empirical information gathered in real-time from past interaction with the data sources. For example, during execution, the data access service may determine that a particular multidimensional data source is low on available memory when a software application has issued a memory-intensive MDX query. Instead of making a remote query request, the system may retrieve the raw data necessary to perform the query from the data source and locally emulate the execution of the query.

Furthermore, based on the characteristics of the enterprise multidimensional data, the data access service may rewrite a complex MDX query as a much simpler query that returns the same data but that will take less processing time and/or consume less memory during execution. For instance, the data access service may determine that a particular run-tree branch can be processed in an order which would reduce the amount of intermediate data required to evaluate the overall query. Thus, even though a data source may support a particular query function, the data access service may optimize each query to realize the most efficient allocation of resources possible.

FIG. 2 is a block diagram illustrating in further detail portions of one embodiment of an enterprise business intelligence system 14. In this example implementation, a single client computing device 16A is shown for purposes of example and includes a web browser 24 and one or more client-side enterprise software applications 26 that utilize and manipulate multidimensional data.

Enterprise business intelligence system 14 includes one or more web servers that provide an operating environment for web applications 23 that provide user interface functions to user 12A and computer device 16A. One or more application servers provide an operating environment for enterprise software applications 25 that implement a business logic tier for the software system. In addition, one or more database servers provide multidimensional data sources 38A-38N (collectively "data sources 38"). The multidimensional data sources may be implemented using a variety of vendor platforms, and may be distributed throughout the enterprise.

Multidimensional data sources 38 represent data sources which store information organized in multiple dimensions. Data on data sources 38 may be represented by a "data cube," a data organization structure capable of storing data logically in multiple dimensions, potentially in excess of three dimensions. In some embodiments, these data sources may be databases configured for Online Analytical Processing ("OLAP"). In some other embodiments, these data sources may be vendor-supplied multidimensional databases having MDX processing engines configured to receive and execute MDX queries.

As shown in FIG. 2, data access service 20 provides an interface to the multidimensional data sources 38. Data access service 20 exposes a consistent, rich set of MDX functions to server-side enterprise applications 25 and/or client-side enterprise applications 26 for each of multidimensional data sources 38 regardless of the specific MDX functions implemented by the particular data source as well as any vendor-specific characteristics or differences between the data sources.

That is, data access service 20 receives MDX query specifications from enterprise applications 25, 26 targeting one or more multidimensional data sources 38. User 12A, for example, may interact with enterprise applications 25, 26 to formulate a report and define a query specification, which in turn results in enterprise applications 25, 26 generating one or more MDX queries. Data access service 20 receives the queries and, for each query, decomposes the query into a plurality of constituent components, referred to as query run-tree nodes. For each query run-tree node, data access server 20 determines whether to direct the query run-tree node to the target multidimensional data source for remote execution or whether to emulate the function(s) by retrieving the necessary data from the target data source and performing the specified function(s) locally, e.g., on the application servers and within the process space of the data access service.

Data access service 20 may make this determination based on a variety of factors, including: (1) the vendor-specific characteristics of data sources 38, (2) the particular MDX features implemented by the MDX query processing engines of each of the data sources, (3) characteristics of the execution unit within each run-tree node of the query, such as amount of data necessary to perform the operation, and (4) current condition with the compute environment, such as network loading, memory conditions, number of current users, and the like. In this manner, data access service 20 permits the enterprise software applications 25 or 26 to issue complex MDX queries to multidimensional data sources 38 without regard to particular MDX features implemented by each of the underlying data sources. As a result, user 12A may interact with enterprise software applications 25, 26 to create reports and provide query specifications that utilize the full, rich features of the query language, such as MDX, regardless of the specific data sources 38.

Figure 3:
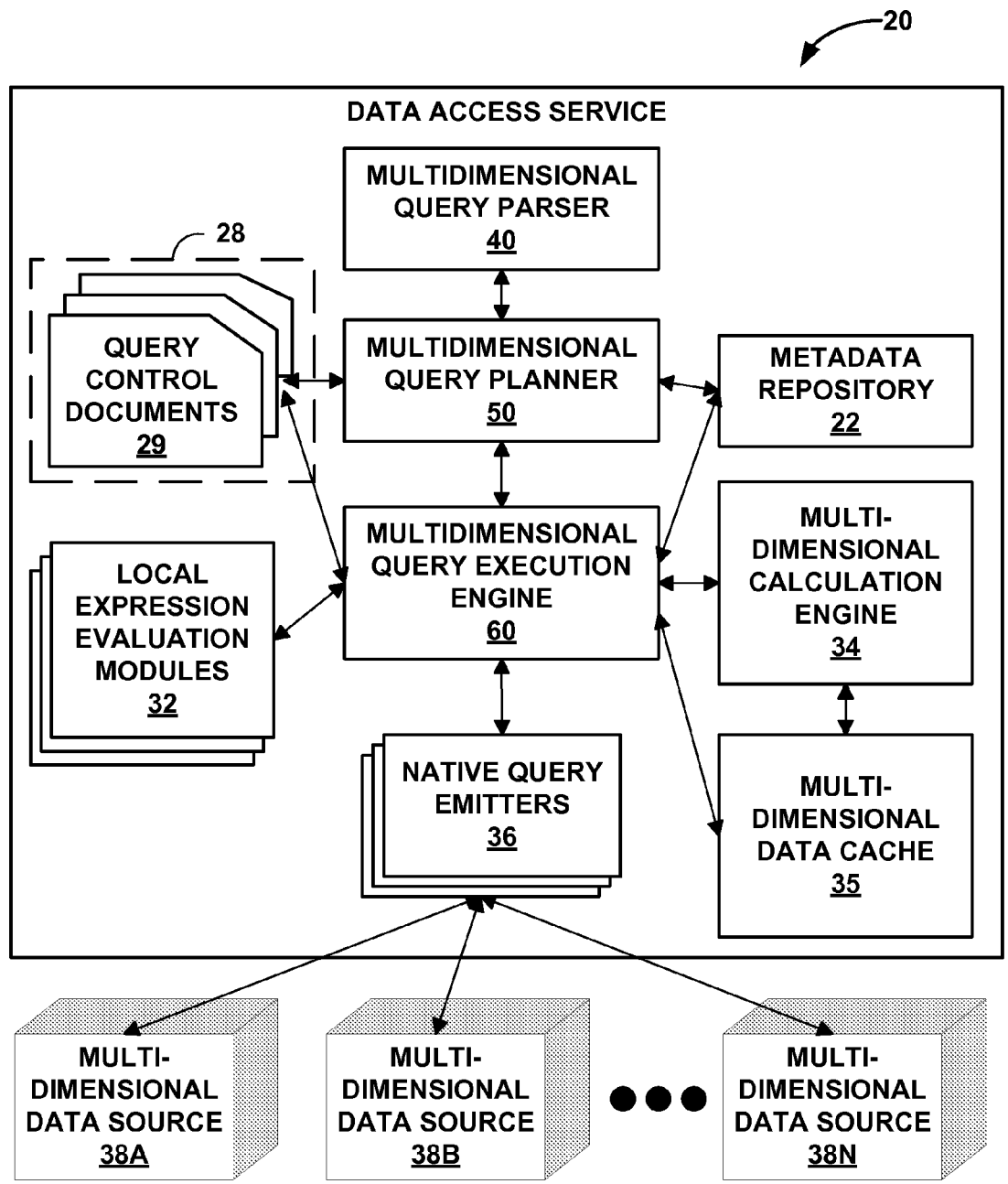
FIG. 3 illustrates in further detail an example embodiment of data access service that provides a logical interface to a plurality of multidimensional data sources.

FIG. 3 illustrates in further detail an example embodiment of data access service 20. In this example embodiment, data access service 20 comprises multidimensional query parser 40, multidimensional query planner 50, and multidimensional query execution engine 60, metadata repository 22, multidimensional capability and performance store 28, local expression evaluation modules 32, multidimensional calculation engine 34, multidimensional data cache 35, and native query emitters 36. Data access server 20 may provide a generic interface between user 12A, particularly computing device 16A, and data sources 38. Data access server 20 may run on the server level, the application level, or as its own intermediate level.

Multidimensional query parser 40 represents a parsing application within enterprise business intelligence system 14. In general, query parser 40 parses a received query into constituted execution units to produce a binary representation of the query in the form of a parse tree. Each node in the parse tree represents one of the discrete query execution units and specifies the function(s) associated with the node and any required query elements Multidimensional query planner 50 processes each node of the parse tree and identifies all known query functions and elements, i.e., those query elements that the planner recognizes with respect to the underlying data sources. Known elements may, for example, be described in metadata repository 22, which the query planner updates in real-time as it processes queries. For any unknown query element, e.g., query elements not previously seen by the planner and thus not specified in metadata repository 22, query planner 50 accesses the appropriate data source 38 to retrieve information necessary to identify the query element. For example, the planner may access one of data sources 38 and determine that an unknown query element is a dimension of a data cube, a measure, a level or some other type of multidimensional object defined within the data source.

During this process, query planner 50 may rearrange the nodes of the parse tree to change their execution order or even remove unnecessary nodes to improve the performance of the query, such as to increase execution speed, reduce the amount of data communicated over the enterprise network by taking advantage of cached data, stored in multidimensional data cache 35, or the like. Once processed by query planner 50, the resultant binary structure is referred to as a run tree.

Multidimensional query execution engine 60 represents an execution engine application within enterprise business intelligence system 14. Query execution engine 60 receives the run tree from query planner 50 and traverses the tree one or more times to determine which query nodes of the run tree should be directed to the target multidimensional data sources 38 for complete processing and execution, and which run-tree nodes query planner 50 should emulate locally. In general, query planner 50 utilizes information from metadata repository 22, multi-dimensional capability and performance store 28, and knowledge of the multidimensional data that is or will be locally stored within data cache 35 at the point in time each of the run tree nodes is to be executed. Query execution engine 60 may even query data sources 38 themselves to retrieve information necessary to make the decisions. For example, query planner 50 may retrieve information from each of data sources 38 that specifies each of functions currently supported by the data source, including any function libraries that have been installed or user-defined calculations.

In one embodiment, query planner 50 may be placed in one of three modes: (1) Remote, (2) Local or (3) Balanced. In Remote mode, the query planner 22 attempts to push the largest possible MDX expressions to be evaluated remotely by the processing engine of the target multidimensional data source 38. In this mode, only when 'local' or 'both' is specified for a particular function will local processing occur. Local processing mode means that only the leaves of the run tree are pushed to the native engine of the target multidimensional data source. All other operations are evaluated locally by local multidimensional calculation engine 34. This may be viewed as a 'safe-mode' which enables the query execution engine 60 to always compute correct/consistent result sets while occasionally sacrificing performance. Balanced processing mode means that query execution engine 60 attempts to designate the largest possible MDX expressions for remote execution, but will use heuristics about the performance of the local calculation engine 34 vs. the remote engines of target data sources 38 to achieve the best possible performance.

Metadata repository 22 stores metadata that describes the structure of data sources 38. For instance, metadata repository 22 may contain the names of cubes, dimensions, hierarchies, levels, members, sets, properties or other objects present within data sources 38. Metadata repository 22 may also store information about the cardinality of dimensions and levels in data cubes stored in data sources 38. Multidimensional query planner 50 may make use of metadata repository 22 to maintain information with respect to the location and organization of multidimensional data within data sources 38. Query planner 50 may utilize the information when retrieving data as well as in making decisions with respect to the execution of nodes of the run tree. Multidimensional query planner 50 may retrieve metadata from metadata repository 22 and bind the metadata to nodes of the run tree for use during execution.

Multidimensional capability and performance store 28 represents a repository of information that may be optionally used by an administrator to control which multidimensional operations (i.e., query run-tree nodes) should be performed locally and which multidimensional operations should be performed remotely. Multidimensional capability and performance store 28 may, for example, be a repository of one or more Extensible Markup Language ("XML") execution control documents 29 used to control query execution engine 60. In one example embodiment, multidimensional capability and performance store 28 contains an XML document for each of data sources 38.

Each XML document contains a set of entries. Each entry specifies a set of 4-tuples, {functionName, canPerformLocally, canPerformRemotely, preferredExecutionLocation}, where functionName represents a string for storing the name of a multidimensional query function, canPerformLocally represents a boolean expression of whether data access service 20 is able to perform the particular function locally, canPerformRemotely represents a boolean expression of whether the function is supported by the respective multidimensional data source and, therefore, can be performed remotely, and preferredExecutionLocation represents a preference as to whether the particular function should be performed locally or remotely. Although the terms string and boolean are used herein, those skilled in the art will recognize that other forms of data representation could be substituted for these data types without losing functionality. As one example, an integer could be used rather than a boolean. As another example, the list of function names could be enumerated and referred to by number rather than by name.

In addition, multidimensional capability and performance store 28 may contain information specific to particular scenarios and recommended execution plans, such as recommendations as to how to execute a combination of particular queries given a particular set of circumstances, for instance, memory availability on the underlying data sources 38. The XML documents within multidimensional capability and performance store 28 may be provided by an administrator associated with the enterprise, by a vendor of data access service 20, by one or more vendors of remote data sources 38, or combinations thereof. Moreover, data access service 20 may modify the XML files during run-time as it learns new information regarding the features and characteristics of data sources 38. Multidimensional query execution engine 60 may also access multidimensional capability and performance store 28 during execution to store heuristic information regarding the performance of particular data sources 38, for example, data source 38A.

Local expression evaluation modules 32 are a set of local software modules capable of performing local multidimensional query evaluations. Multidimensional query execution engine 60 invokes local expression evaluation modules 32 to locally execute those nodes of the run tree designated for local execution. To improve efficiencies, multidimensional query execution engine 60 may rearrange the nodes of the run tree so as to group all run-tree nodes to be performed locally once the nodes of the run tree designated to be evaluated remotely have been evaluated. This may, for example, allow local expression evaluation module 32 to better utilize cached data in multidimensional data cache 35 and may reduce the length of time the data need be locally cached. Local expression evaluation modules 32 return the results of local queries to multidimensional execution engine 60 in the form of one or more multidimensional result sets.

Native query emitters 36 interact with multidimensional data sources 38 to issue queries and direct the data sources to execute the functions associated with nodes of the run tree designated for remote execution. Native query emitters 36 may issue structured MDX queries to multidimensional data sources 38 according to operations defined by the nodes. Data sources 38 remotely apply the multidimensional operations on the data and return one or more result sets. Native query emitters 36 return the results of the queries of multidimensional data sources 38 to multidimensional execution engine 60. Multidimensional execution engine 60 produces a combined result set from the results received from native query emitters 36 and local expression evaluation modules 32, and returns the combined result set to the requesting enterprise software applications 25, 26.

Figure 4:
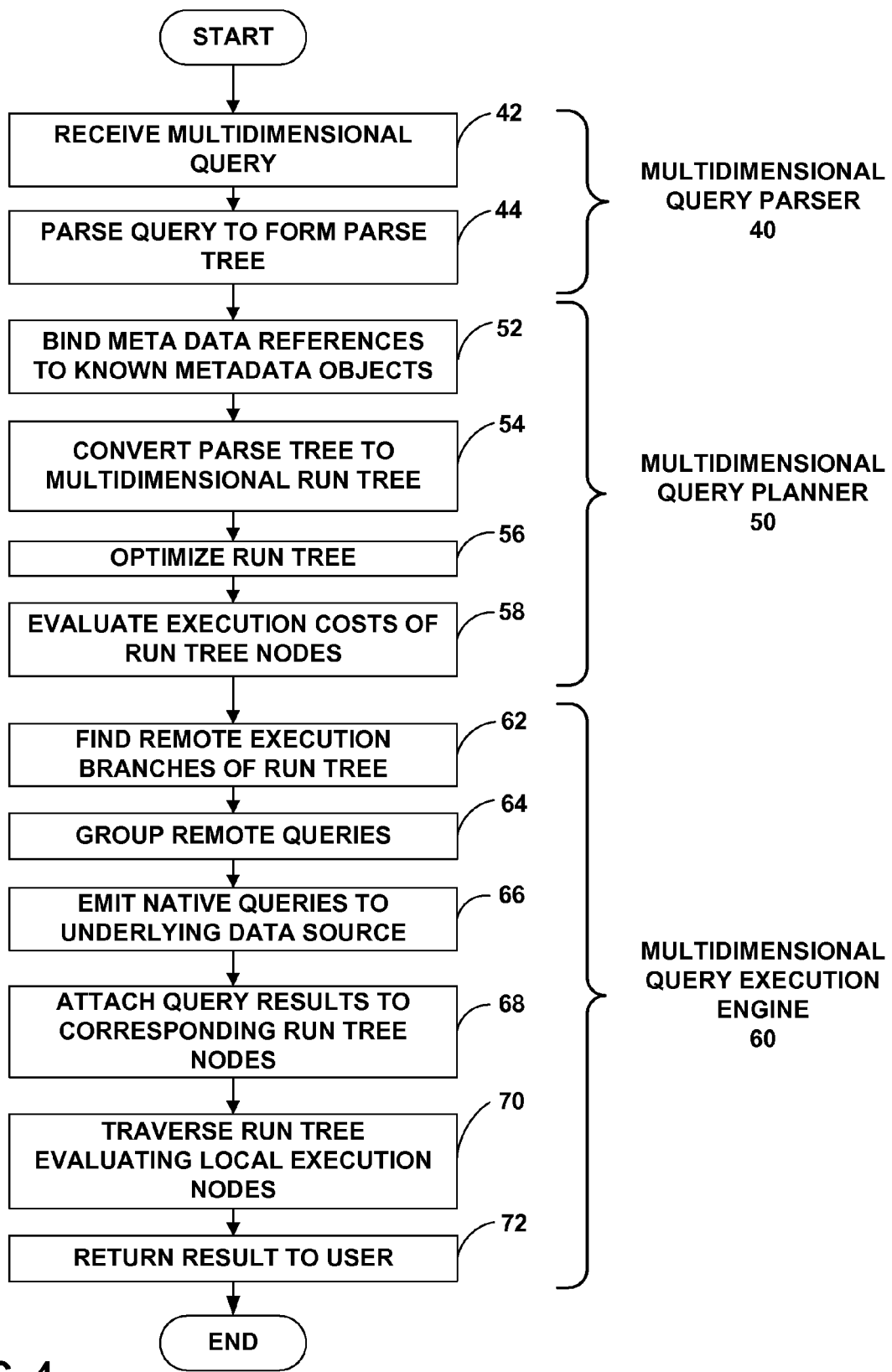
FIG. 4 is a flowchart illustrating example operation of a data access service when processing a query of a multidimensional database.

FIG. 4 is a flowchart illustrating an example operation of data access service 20 when processing a query directed to multidimensional data sources 38. Although described in reference to enterprise business intelligence system 14 of FIG. 2, the principles of the invention should not be limited to the described embodiments and may be applied to any system capable of storing multidimensional data in a database.

Initially, user 12A interacts with enterprise software applications 25, 26 to build a report and, in so doing, defines a query specification for multidimensional data. This query specification may define ranges or slices of target data cubes as well as data manipulation operations to perform on the data cubes. In response, enterprise software applications 25, 26 construct and issue one or more structure MDX queries for multidimensional data sources 38. Computing device 16A may transmit this query request through network 18 to data access service 20. Data access service 20 intercepts or receives the query, e.g., by way of an API presented to enterprise applications 25, 26. (42).

Multidimensional query parser 40 parses the query into a parse tree as explained above (44). The resulting parse tree may be a binary tree structure of hierarchical nodes, each node representing an execution unit in the form of a potentially more simple multidimensional query, query element(s) and/or data manipulation function(s).

Next, multidimensional query planner 50 receives the parse tree from multidimensional query parser 40 and analyzes the nodes of the parse tree to identify references to known metadata objects. For example, multidimensional query planner 50 may identify references to levels, dimensions, cubes, hierarchies, members, sets, or properties and determine whether the referenced objects correspond to metadata within metadata repository 22. For any unknown query element, query planner 50 accesses the appropriate data source 38 to retrieve information necessary to identify the query element. Query planner 50 updates metadata repository 22 to record the identified element.

When multidimensional query planner 50 finds a known metadata reference, it binds the metadata object to the parse tree (52) at the corresponding node in the parse tree making the reference. In this way, query planner 50 links metadata to a given node of the parse tree for each of the query elements required for execution of the multidimensional operations specified by the node.

Multidimensional query planner 50 may analyze the parse tree to rearrange nodes, split a node into multiple nodes, or even remove nodes or branches to improve execution of the nodes, thereby producing the run tree (54). A run tree may maintain the form of a binary tree and, in general, may be viewed as a hierarchical arrangement of nodes. Like the parse tree, each node represents an execution unit and may specify simplified multidimensional queries and query elements necessary to accomplish one or more data manipulation functions.

Next, query planner 50 optimizes the run tree by determining whether each node of the run tree should be executed locally or remotely (56). Query planner updates the node to record the decision. During this process, multidimensional query planner 50 may weigh the costs of executing node locally (i.e., deploying the run-tree node locally such as at the application server) versus the costs of remote execution (58). This may include comparing the computing efficiency of executing a query locally as opposed to remotely in terms of data transfer requirements, memory consumption and/or processor time, or whether the underlying data source, for example, data source 38A, is capable of performing the functions specified within the execution unit, i.e., that particular run-tree node. Furthermore, multidimensional query planner 50 may also elect to execute certain functions locally when those functions rely only on metadata and not data stored in data sources 38. For example, conditional statements may rely only on metadata, so multidimensional query planner 50 may indicate that a conditional statement in a node of the run tree should be executed locally using metadata repository 22 rather than remotely.

Multidimensional query planner 50 may determine whether the underlying data source is capable of performing a given query by obtaining information from multidimensional capability and performance store 28, which may be used to provide control information to influence the execution of specific functions relative to data sources 38. As discussed, query planner 50 may also obtain this information directly from the underlying data source, for instance, multidimensional data source 38A, by issuing a request to multidimensional data source 38A to return a list of supported functions.

In building the run tree, multidimensional query planner 50 may then group those run-tree nodes designated for local execution from those designated to be performed remotely. In this way, multidimensional query planner 50 may rearrange nodes from the parse tree in building the run tree to form an execution order that is more efficient than the parse tree.

Multidimensional query planner 50 may also remove nodes from the run tree that it determines it need not evaluate in order to return the results of the overall query to the user. For example, given the two branches to a conditional statement, that is, one set of operations for "true" and another set of operations for "false," if multidimensional query planner 50 determines that the condition will be evaluated a certain way, for example, "true," then multidimensional query planner 50 will exclude those operations corresponding to "false," as they will never be executed and hence are not necessary for determining the result of the overall query.

Multidimensional query planner 50 may then pass the optimized run tree to multidimensional query execution engine 60, which ultimately controls whether the run-tree nodes corresponding to the nodes of the run tree are executed locally or remotely. Multidimensional query execution engine 60 may make the decisions based on the indications from multidimensional query planner 50 as specified in the node being analyzed or based on heuristics gathered at run time.

If multidimensional query execution engine 60 determines that a given run-tree node should be performed remotely, the execution engine may execute that query remotely even though query planner 50 had specified it to be performed locally. In this manner, query execution engine 60 may override the specification of query planner 50 based on current conditions or recently learned information related to the functions and characteristics of data sources 38. Similarly, execution engine 60 may execute a query locally which was designated to be performed remotely. Multidimensional query execution engine 60 may gather and evaluate performance heuristics during execution to make these overriding decisions. For example, certain queries be formulated to request more data from data sources 38 than is actually needed for executing the query; multidimensional query execution engine 60 may recognize such a query and limit the data gathered to only that which is necessary to perform the query. As another example, multidimensional query execution engine 60 may determine that a particular operation over a particular dimension in a particular data source, for instance, multidimensional data source 38A, is being executed slowly under current operating conditions. Multidimensional query execution engine 60 may then determine that this operation would execute faster locally rather than remotely. Multidimensional query execution engine 60 may store this information in multidimensional capabilities and performance store 28 for future use. Multidimensional query execution engine 60 may alter the current or future run trees to reflect this determination. If a given function is to be evaluated locally and requires more than metadata, multidimensional query execution engine 60 may still need to retrieve data from data sources 38 through native query emitters 36 and execute the multidimensional function locally on the native data. Query execution engine 60 may store such retrieved native data in multidimensional data cache 35.

After processing the run tree, multidimensional query execution engine 60 passes the run tree to native query emitters 36, which will then traverse the run tree to find each node designated for remote execution (62). Native query emitters 36 may group these nodes together (64) and then issue the queries to the underlying multidimensional data sources 38 (66). Native query emitters 36 may also merge similar queries to improve performance when executed by the remote data sources 38. Native query emitters 36 may then store the results of these queries (i.e., multidimensional result sets) to the corresponding nodes of the run tree (68) and return the run tree to multidimensional query execution engine 60.

Next, multidimensional query execution engine 60 may traverse the run tree to execute all remaining run-tree nodes which have been designated to execute locally (70). Multidimensional query execution engine 60 performs these local functions, making use of metadata retrieved from metadata repository 22 and possibly retrieving native multidimensional data from the data sources (i.e., by retrieving the data, which query execution engine 60 may store in multidimensional data cache 35, without requiring remote data manipulations), or by utilizing data stored in multidimensional data cache 35. Query execution engine may invoke multidimensional calculation engine 34 to execute multidimensional calculations on the data, and may direct local expression evaluation modules 32 to locally evaluate multidimensional expressions. Multidimensional query execution engine 60 may then combine the local results with all of the results from the remote operations to form a final result set for the original query. Data access service 20 may then return this result set to software applications 25, 26 for presentment to user 12A through network 18 and computing device 16A (72).

Figure 5:
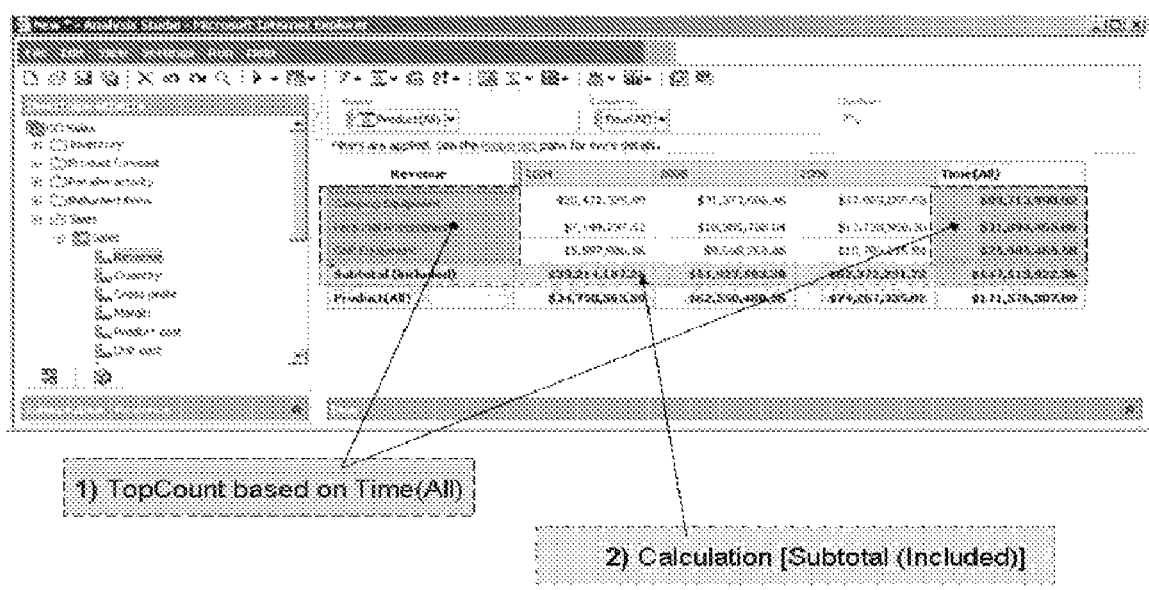
FIG. 5 illustrates an example report generated in response to a query of a multidimensional database.

FIG. 5 is an example user interface 80 presented by software applications 25 or 26 by which a user, such as user 12A, defines a report and creates a query specification for manipulating multidimensional data from a multidimensional database. In the example, a user has requested a cross tabulation between dimensions along the x-axis and y-axis. More specifically, the example shows a contingency table in a matrix format. The example report displays product revenue for each product by year, as well as the total revenue earned over all years for each of the three products.

To develop a query, a user may drag and drop various items from the Insertable Objects list to the report screen. These items may include desired inventory and various reports, such as revenue, gross profit, total sales, unit costs, margin, or a host of other reports a user may desire. As described herein, software applications 25, 26 issue one or more MDX queries based on the query specification created by the user and without regard to the differences in features or characteristics of the underlying data sources 38. Data access service 20 transparently disassembles the MDX queries into execution units, executes the individual units locally or remotely, and presents a combined result set back to the software applications. In this manner, data access service 20 hides the vendor-specific MDX implementations of the underlying multidimensional data sources and presents a rich MDX feature set to software applications 25, 26.

Figures 6A, 6B:
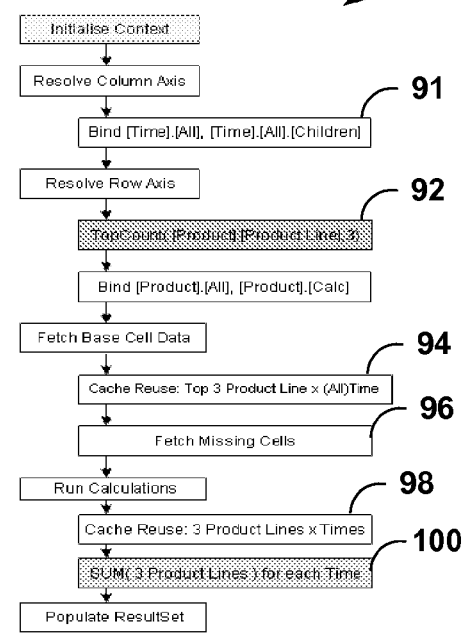
FIGS. 6A-6B are block diagrams illustrating an example MDX query and a run tree generated by the data access service when processing the MDX query.

FIG. 6A depicts an exemplary MDX query 84 that might be issued by enterprise software applications 25, 26 within enterprise business intelligence system 14. Multidimensional query parser 40 may receive MDX query 84 and, according to the techniques discussed herein, generate a parse tree, which may then be optimized by multidimensional query planner 50 as described herein.

FIG. 6B depicts an exemplary run tree 86 which may be the result from multidimensional query planner 50. In this example, multidimensional query planner 50 has determined that the targeted data source supports both the TopCount function and the Sum function. Query planner 50, therefore, pushed the TopCount expression into is own MDX query of node 92 and designated the node for remote execution of the TopCount function. However, in this example, multidimensional query planner 50 has determined that the Sum function will likely perform more efficiently locally by making use of cached data in multidimensional data cache 35. For this reason, query planner 50 has inserted nodes 94, 96 to locally cache certain required data and inserted node 98 to fetch only the missing cells. Query planner 50 also designated node 100 for local execution by local multidimensional calculation engine 34.

Figure 7:
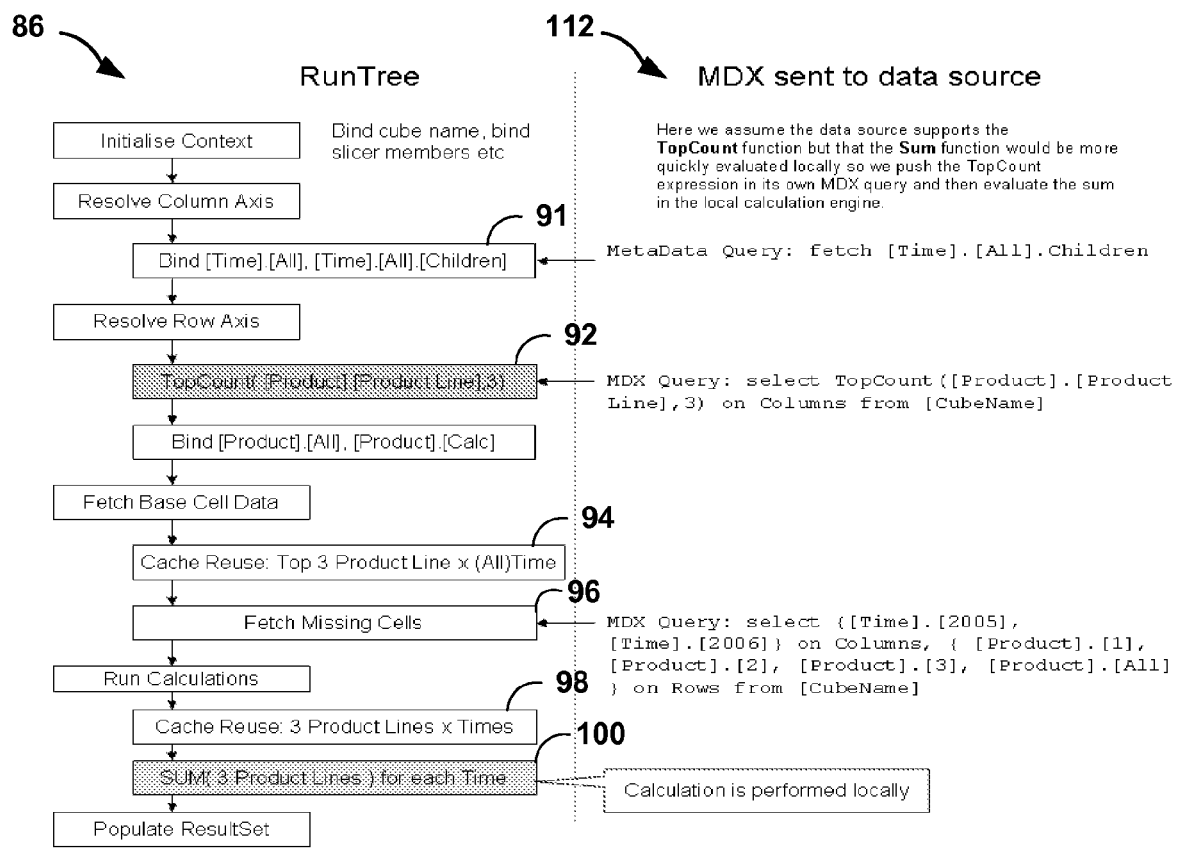
FIG. 7 is a block diagram illustrating the remote queries which correspond to the nodes of the run tree.

FIG. 7 is a block diagram showing run tree 86 of FIG. 6B and three queries that are issued when executing the nodes of the run tree. As shown in FIG. 7, node 91 results in a local query to metadata repository 22 retrieve and bind metadata to the query element Time. Node 92 results in an MDX query to direct a remote data source to perform the TopCount function. Node 96 results in an MDX query to a remote data source to fetch missing cells selected by Time and Product from a data cube. In this manner, the MDX query 94 (FIG. 6A) is decomposed into run-tree nodes, including three separate queries, with some of the data manipulation operations being performed locally and others remotely.

Example Query Control Document

The following listing illustrates is an example query control document in XML form:

```
- <provider name="DATA SOURCE VENDOR">
- <providerDetails>
- <!-- Options include Remote, Local, Balanced -->
    <parameter name="ProcessingMode" value="Local" />
  </parameters>
- <!-- Each MDX function will be processed according to the
  ProcessingMode set above. However functions with special behavior
  or which have behavior that differs from the default processing mode
  will have entries in the function list below -->
- <functions>
- <function name="NonEmpty">
    <remoteSupport value="true" />
    <localSupport value="true" />
    - <!-- When execution location is set to 'both' NonEmpty is always
      pushed to the remote source to try to reduce the size of the result
      returned however it is then also be processed locally. This is
      because this data source has non empty behavior which is
      inconsistent with the desired non empty behavior
      -->
      <preferredExecutionLocation value="both" />
  </function>
- <function name="Crossjoin">
    <remoteSupport value="true" />
    <localSupport value="true" />
    <preferredExecutionLocation value="local" />
    <RemoteCrossjoinThreshold value="100000" />
    - <!-- Local crossjoins are used normally. However remote
      crossjoins are enabled when the estimated size of a crossjoin result
      is greater than 100,000 tuples. -->
  </function>
- <function name="Intersect">
    <remoteSupport value="true" />
    <localSupport value="true" />
    <preferredExecutionLocation value="remote" />
    <singleMemberExecutionLocation value="local" />
    - <!-- When an intersect contains a single member as one of its
      parameters the local execution engine will attempt to resolve the
      intersect using meta-data otherwise it will still be pushed to the
      remote MDX engine -->
  </function>
- <function name="Filter">
    <remoteSupport value="true" />
    <localSupport value="true" />
    <preferredExecutionLocation value="balance" />
    - <!-- In balanced mode the filter expression will attempt to use
      cached data or meta-data information to locally evaluate the
      expressions, if the parameters to the filter are not cached then the
      filter expression is pushed to the remote engine. -->
    - <!-- FILTER( S1, <Condition>) Whether to execute this locally
      isn't just dependent on the size of S1 but also the complexity of
      the <Condition>. In cases where the <Condition> is complex it may
      be quicker to execute it locally rather than ascetain all the
      dependencies of the <Condition> expression (such as calculated
      members etc), especially if S1 is small. So the cost of the filter
      condition and the set size are used to determine the bext execution
      location    -->
    <enableFilterRewrite value="true" />
    - <!-- The Filter rewrite process looks at the set expression of a
      filter to determine if it is of the form FILTER( CROSSJOIN( S1, S2),
      <Condition>) ) if so it will rewrite the filter as CROSSJOIN(
      FILTER( S1, <Condition>), FILTER(S2, <Condition>)) the second
      version will be quicker to process locally or remotely. -->
  </function>
- <function name="Aggregate">
    <remoteSupport value="true" />
    <localSupport value="true" />
    <preferredExecutionLocation value="balance" />
    <localExecutionSetSizeThreshold value="10000" />
    - <!-- Aggregate(S1, <Numeric Expression>) Where local execution
      is possible, that is when the correct aggragetion method to use is
      known, this aggregate can be performed locally but only where S1 is
      small and the <Numeric Expression> is simple. Thus the cost of the
      numeric expression and the approximate size of S1 must be
      determined in order to balance this query.
      -->
  </function>
- <function name="Generate">
    <remoteSupport value="true" />
    <localSupport value="true" />
    <preferredExecutionLocation value="remote" />
    <enableGenerateRewrite value="true" />
    - <!-- Generate functions are computationally expensive. The query
```

-continued

```
execution engine rewrites generate to remove unnecessary generates
by converting them to Crossjoins. Generate rewrite is only safe to
do in certain circumstances. i.e. GENERATE( S1, CROSSJOIN(
S1.CurrentMember, S2) )(where S2 does not contain the dimension in
S1)Can be better expressed as: CROSSJOIN(S1, S2) -->
</function>
- <!-- Each Top.. or Bottom.. set operations is very expensive if
performed locally hence these all always pushed to the remote database for
processing-->
- <function name="TopCount">
    <remoteSupport value="true" />
    <localSupport value="true" />
    <preferredExecutionLocation value="remote" />
</function>
- <function name="TopPercent">
    <remoteSupport value="true" />
    <localSupport value="true" />
    <preferredExecutionLocation value="remote" />
</function>
- <function name="TopSum">
    <remoteSupport value="true" />
    <localSupport value="true" />
    <preferredExecutionLocation value="remote" />
</function>
- <function name="BottomCount">
    <remoteSupport value="true" />
    <localSupport value="true" />
    <preferredExecutionLocation value="remote" />
</function>
- <function name="BottomPercent">
<remoteSupport value="true" />
<localSupport value="true" />
<preferredExecutionLocation value="remote" />
</function>
- <function name="BottomSum">
    <remoteSupport value="true" />
    <localSupport value="true" />
    <preferredExecutionLocation value="remote" />
</function>
</functions>
</providerDetails>
</provider>
```

Exemplary MDX Functions Designated as Local Execution Units

The data access service described herein (e.g., data access service 20 of FIG. 2) may be configured to perform a set of predefined execution units locally (e.g., using local multidimensional calculation engine 34 of FIG. 2). The following is an example list of MDX functions that are prime candidates for local executions. Data access service 20 is extendable so the functions that may be performed locally are not limited to the exemplary functions listed below. However, the following list is typically sufficient so as to support a rich set of functions to the enterprise software applications regardless of the MDX functions supported by the underlying data sources.

Member Operations—Operations for obtaining information related to dimensional members can often be efficiently determined locally based on metadata. Table A provides an exemplary list of member operations that may be pre-designated for local execution.

TABLE A

| | |
|---|---|
| Ancestor ( <<Member>>, <<Level>> ) returns <<Member>> | Ancestor( <<Member>>, <<Distance>> ) returns <<Member>> |
| ClosingPeriod (..) | Cousin (..) |
| Lag (..) | Lead (..) |
| OpeningPeriod (..) | ParallelPeriod (..) |

Numeric Operations—Numeric operations are candidates for efficient local execution in that the necessary data may be cached within the computing environment of the data access service. Alternatively, a simple MDX query to retrieve the native data can be issued without requiring the target data source to apply any multidimensional data manipulation operation. Table B provides an exemplary list of numeric operations that may be pre-designated for local execution.

TABLE B

| | |
|---|---|
| Aggregate(..) | Average (..), Avg (..) |
| Count( <<Set>> ) <returns <<Numeric>> | Max (..) |
| Median (..) | Min (..) |
| Rank (..) | StdDev (..) |
| StdDevP (..) | StDev (..) |
| StDevP (..) | Sum( <<Set>>, [<<Numeric Value Expression>>] ) returns <<Numeric>> |
| Var (..) | Variance (..) |
| VarianceP (..) | VarP (..) |

Conditional Operations—MDX IFF statements are candidates for local resolution because the statements typically only involve metadata, for example, the count of members on a level. Consequently, the inputs to the IFF statements are available locally within the computing environment of the data access service. Table C lists the IFF conditional statement as a candidate designation for local execution.

TABLE C

| |
|---|
| IFF( <<boolean expression>>, <<ifTrueExression>>, <<ifFalseExpression>>) |

Set Operations—Table D provides an exemplary list of set operations that may be pre-designated for local execution. Set operations form a large part of MDX query execution, so the decision to execute these locally or remotely can have a significant impact on performance. Often set operations are 'associative', meaning they can be evaluated in any order and still achieve the same result.

TABLE D

| | |
|---|---|
| AddCalculatedMembers (..) | Ancestors (..) |
| Ascendants (..) | BottomCount (..) |
| BottomPercent (..) | BottomSum (..) |
| Crossjoin (..) | Descendants (..) |
| Distinct (..) | DrillDownLevel (..) |
| DrillDownMember (..) | DrillDownMemberBottom (..) |
| DrillDownMemberTop (..) | DrillUpLevel (..) |
| DrillUpMember (..) | Edge (..) |
| Except (..) | Extract(..) |
| Filter (..) | Generate (..) |
| Head (..) | Hierarchize (..) |
| Intersect (..) | LastPeriods (..) |
| Nest (..) | NonEmptyCrossjoin (..) |
| Order( <<Set>>, {<<value expression>>} [, ASC\|DESC\|BASC\|BDESC] ) returns <<Set>> | PeriodsToDate (..) |
| Subset( <<Set>> , startIndex [,count] ) returns <<Set>> | Tail (..) |
| ToggleDrillState (..) | TopCount (..) |
| TopPercent (..) | TopSum (..) |
| Union (..) | |

String operations—Table E provides an exemplary list of string operations that may be pre-designated for local execution.

TABLE E

| | |
|---|---|
| Properties, property fetching | Instr |
| LCase | Left |
| Len( <<String>>) returns <<Numeric>> | Right |
| Int | Mid |
| UCase | |

Simple Math—Table F provides an exemplary list of based mathematical operations that may be pre-designated for local execution.

TABLE F

| | |
|---|---|
| + (plus operator) | − (minus operator) |
| * (multiply operator) | / (divide operator) |

Other—Table G provides an exemplary list of other miscellaneous operations that may be pre-designated for local execution.

TABLE G

| | |
|---|---|
| Abs | Round |
| RoundDown | RoundUp |
| Item | Level |
| Dimension | |

Example MDX Query Simplification Example

In many systems, it is not uncommon for a single MDX query statement to be hundreds or even thousands of lines long. The following is an example an MDX statement for conditional axis resolution. In this real-world example, the MDX query generated by the enterprise software application is 250 lines long.

Specifically, the exemplary MDX query listed below relates to a 'More' calculation. The More calculation is a reporting concept where a user might select a level within a dimension to be displayed in a report. The level might contain 100s or 1000s of members, and by default the enterprise software application generates an MDX statement directing the target data source to reduce the number of members actually returned. In situations where the number returned is less than the entire level selection, a calculation is created which shows the total of the remaining members which are not displayed. The following illustrates the complex MDX query statement issued by the enterprise software application and received by the data access service:

```
WITH
  MEMBER
    [Country].[uuid:00000be44435270500000004] AS '
    IIF(
      COUNT(
        HEAD(
          [Country].[All].CHILDREN,
          1),
        INCLUDEEMPTY)= 0,
      [Country].[All],
      (([Country].[All])-
        IIF(
          (NOT
            ISEMPTY(
              [Country].[All])AND
            ISEMPTY(
              SUM(
                [Country].[All].CHILDREN))),
          0,
          SUM(
            [Country].[All].CHILDREN))))',
    SOLVE_ORDER = 8
  MEMBER
    [Country].[uuid:00000be44435270500000002] AS '
    IIF(
      COUNT(
        HEAD(
          HEAD(
            [Country].[All].CHILDREN,
            IIF(
              COUNT(
                HEAD(
                  [Country].[All].CHILDREN,
                  ((12+2)+1)),
                INCLUDEEMPTY)>
              (12+2),
              12,
              (12+2))),
          1),
        INCLUDEEMPTY)= 0,
      IIF(
        COUNT(
          HEAD(
            [Country].[All].CHILDREN,
            1),
          INCLUDEEMPTY)= 0,
        IIF(
          COUNT(
            HEAD(
              {[Country].[uuid:00000be44435270500000004]},
              1),
            INCLUDEEMPTY)= 0,
          [Country].[All],
          NULL),
        [Country].[calc_uuid:00000b784435271100000003]),
        (([Country].[All])-
          IIF(
            (NOT
              ISEMPTY(
                [Country].[All])AND
              ISEMPTY(
                [Country].[calc_3])),
            0,
            ([Country].[calc_3]))))',
    SOLVE_ORDER = 8
  MEMBER
    [Country].[calc_uuid:00000b784435271100000003] AS '
    SUM(
      [Country].[All].CHILDREN)',
    SOLVE_ORDER = 8
  MEMBER
    [Country].[calc_3] AS '
    SUM(
      HEAD(
        [Country].[All].CHILDREN,
        IIF(
          COUNT(
            HEAD(
              [Country].[All].CHILDREN,
              ((12+2)+1)),
            INCLUDEEMPTY)>
          (12+2),
          12,
          (12+2))))',
    SOLVE_ORDER = 8
  MEMBER
    [Country].[COG_OQP_INT_t2]AS '1',
    SOLVE_ORDER = 65535
  MEMBER
    [Country].[COG_OQP_INT_t1]AS '1',
    SOLVE_ORDER = 65535
  MEMBER
    [CalendarMonth].[uuid:00000ba84435270a00000005] AS '
    IIF(
      COUNT(
        HEAD(
          [CalendarMonth].[All].CHILDREN,
```

```
            1),
          INCLUDEEMPTY)= 0,
        [CalendarMonth].[All],
        ((([CalendarMonth].[All])-
          IIF(
            (NOT
              ISEMPTY(
                [CalendarMonth].[All])AND
              ISEMPTY(
                SUM(
                  [CalendarMonth].[All].CHILDREN))),
              0,
              SUM(
                [CalendarMonth].[All].CHILDREN))))',
  SOLVE_ORDER = 6
MEMBER
  [CalendarMonth].[uuid:00000ba84435270a00000003] AS '
    IIF(
      COUNT(
        HEAD(
          HEAD(
            [CalendarMonth].[All].CHILDREN,
            IIF(
              COUNT(
                HEAD(
                  [CalendarMonth].[All].CHILDREN,
                  ((12+2)+1)),
                INCLUDEEMPTY)>
                (12+2),
                12,
                (12+2))),
            1),
          INCLUDEEMPTY)= 0,
        IIF(
          COUNT(
            HEAD(
              [CalendarMonth].[All].CHILDREN,
              1),
            INCLUDEEMPTY)= 0,
          IIF(
            COUNT(
              HEAD(
                {[CalendarMonth].[uuid:00000ba84435270a00000005]},
                1),
              INCLUDEEMPTY)= 0,
            [CalendarMonth].[All],
            NULL),
          [CalendarMonth].[calc_uuid:00000b784435271100000004]),
        ((([CalendarMonth].[All])-
          IIF(
            (NOT
              ISEMPTY(
                [CalendarMonth].[All])AND
              ISEMPTY(
                [CalendarMonth].[calc_5])),
              0,
              ([CalendarMonth].[calc_5]))))',
  SOLVE_ORDER = 6
MEMBER
  [CalendarMonth].[calc_uuid:00000b784435271100000004] AS '
    SUM(
      [CalendarMonth].[All].CHILDREN)',
  SOLVE_ORDER = 6
MEMBER
  [CalendarMonth].[calc_5] AS '
    SUM(
      HEAD(
        [CalendarMonth].[All].CHILDREN,
        IIF(
          COUNT(
            HEAD(
              [CalendarMonth].[All].CHILDREN,
              ((12+2)+1)),
            INCLUDEEMPTY)>
            (12+2),
            12,
            (12+2))))',
  SOLVE_ORDER = 6
MEMBER
      [CalendarMonth].[COG_OQP_INT_t4]AS '1',
      SOLVE_ORDER = 65535
  MEMBER
      [CalendarMonth].[COG_OQP_INT_t3]AS '1',
      SOLVE_ORDER = 65535
SELECT
  {[Measures].[Cost of Goods Sold]}
  DIMENSION PROPERTIES PARENT_LEVEL,
    PARENT_UNIQUE_NAME
  ON AXIS(0),
  {HEAD([Country].[All].CHILDREN,
    IIF(
      COUNT(
        CROSSJOIN(
          HEAD(
            [Country].[All].CHILDREN,
            ((12+2)+1)),
          {[Measures].[Cost of Goods Sold]}),
        INCLUDEEMPTY)>
        (12+2),
        12,
        (12+2))),
    {([Country].[COG_OQP_INT_t1])},
    HEAD(
      {[Country].[uuid:00000be44435270500000002]},
      IIF(
        COUNT(
          CROSSJOIN(
            HEAD(
              [Country].[All].CHILDREN,
              (14+1)),
            {[Measures].[Cost of Goods Sold]}),
          INCLUDEEMPTY)> 14,
          1,
          0)),
    {([Country].[COG_OQP_INT_t2])},
    {[Country].[All]}}
  DIMENSION PROPERTIES PARENT_LEVEL,
    PARENT_UNIQUE_NAME
  ON AXIS(1),
  {HEAD([CalendarMonth].[All].CHILDREN,
    IIF(
      COUNT(
        CROSSJOIN(
          HEAD(
            [CalendarMonth].[All].CHILDREN,
            ((12+2)+1)),
          {[Measures].[Cost of Goods Sold]}),
        INCLUDEEMPTY)>
        (12+2),
        12,
        (12+2))),
    {([CalendarMonth].[COG_OQP_INT_t3])},
    HEAD(
      {[CalendarMonth].[uuid:00000ba84435270a00000003]},
      IIF(
        COUNT(
          CROSSJOIN(
            HEAD(
              [CalendarMonth].[All].CHILDREN,
              (14+1)),
            {[Measures].[Cost of Goods Sold]}),
          INCLUDEEMPTY)> 14,
          1,
          0)),
    {([CalendarMonth].[COG_OQP_INT_t4])},
    {[CalendarMonth].[All]}}
  DIMENSION PROPERTIES PARENT_LEVEL,
    PARENT_UNIQUE_NAME
  ON AXIS(2)
FROM
  [Sales Cube]
  CELL PROPERTIES VALUE,
    FORMAT_STRING
```

In the above listing, twelve different calculations are required to perform the 'More' calculation in two different axes of the report. With respect to report selections and layout, the report has three axes, where a first two axes contain selections from the levels of dimensions. Hence the more calculation is included in the MDX query statement. In the bottom sections, axis resolution and conditional axis resolution are performed.

Upon receiving the example MDX query listed above, the data access service performs the query simplification techniques described herein. For example, the data access service designates the IFF statements for local resolution because the statements only involve metadata, for example, the count of members on a level. Further, because less than twelve members exist on the level, the data access service determines that the axis excludes the 'More' calculation and that the More calculation section of the MDX query is redundant and can be removed. As a result, the data access service determines that the axes can be resolved locally to simpler selections and much simpler MDX can be emitted to the underlying MDX data sources. For example, in replace of the complex MDX statement above, which exceeds 250 lines, the data access service issues the following query to the underlying MDX data source:

```
SELECT
    {[Country].[Asia],
        [Country].[Other],
        [Country].[Europe],
        [Country].[All],
        [Country].[America]}
    ON COLUMNS ,
    {[CalendarMonth].[2003-01],
        [CalendarMonth].[2003-02],
        [CalendarMonth].[2002-11],
        [CalendarMonth].[All],
        [CalendarMonth].[2002-12],
        [CalendarMonth].[2002-10],
        [CalendarMonth].[0000-00]}
    ON ROWS
FROM
    [Sales Cube]
WHERE
    ([Measures].[Cost of Goods Sold])
```

The techniques described herein make reference to the MDX query language, as MDX is currently the most prominent multidimensional data query language. However, the techniques described herein can likely be applied to other structured languages capable of querying multidimensional data structures. The examples used herein reference MDX merely because of its prevalence. These examples should not be understood to limit the application of the invention to MDX, as the techniques may be applied to any multidimensional data querying language.

Various embodiments of the invention have been described. These and other embodiments are within the scope of the following claims.

The invention claimed is:

1. A method comprising:
receiving, from an enterprise software application, a query by a data access service executed by a computing device, the data access service being positioned between the enterprise software application and a plurality of multidimensional data sources, wherein the query conforms to a multidimensional query language specifying a set of multidimensional operations, and wherein the multidimensional data sources are supplied by different vendors and provide different implementations of the set of multidimensional operations;

parsing the multidimensional query into a plurality of execution units by the data access service executed by the computing device, wherein the execution units specify multidimensional operations required to perform the query;

retrieving, by the data access service, control information from an execution control document associated with a target one of the multidimensional data sources wherein the execution control document includes a plurality of entries, wherein each entry comprises a set of 4-tuples, each 4-tuple comprising (1) data specifying a multidimensional operation supported by the multidimensional query language, (2) data providing an indication of whether a local multidimensional calculation engine of the data access service is capable of performing the specified multidimensional operation, (3) data providing an indication of whether a multidimensional calculation engine within the target multidimensional data source can perform the specified multidimensional operation, and (4) data providing a preference as to whether the specified multidimensional operation should be performed;

identifying, within the execution control document, preferences for executing the set of multidimensional operations of the execution units using the local multidimensional calculation engine of the data access service or calculation engines of the target multidimensional data source;

for each of the execution units:
 (i) determining, by the data access service executed by the computing device, whether the implementation of the set of features of the target multidimensional data source supports any multidimensional operation specified by the execution unit,
 (ii) determining, by the data access service executed by the computing device, whether a local multidimensional calculation engine of the data access service is likely to perform the multidimensional operation more efficiently than a query processing engine of the target multidimensional data source, and
 (iii) designating, by the data access service executed by the computing device, the execution unit for either remote execution by a target one of the multidimensional data sources or locally by the data access service based on the determinations and the identified preferences; and executing each of the multidimensional execution units locally by a multidimensional calculation engine within the data access service or remotely using a query processing engine of the target data source based on the designation, wherein the multidimensional calculation engine is executed by the computing device.

2. The method of claim 1, further comprising:

receiving intermediate result sets produced by local execution of the multidimensional execution units designated for execution by the multidimensional calculation engine of the data access service;

receiving intermediate result sets produced by remote execution of the multidimensional execution units designated for execution by the target multidimensional data source;

combining the intermediate result sets to form a combined result set; and returning the combined result set to the enterprise software application in response to the query.

3. The method of claim 1, further comprising:

generating a parse tree having a plurality of hierarchically arranged nodes, wherein each node corresponds to one of the execution units, wherein each node comprises an expression to be evaluated or a function to be performed; and processing the nodes of the parse tree to produce a run tree ready for execution.

4. The method of claim 3, wherein the run tree includes the plurality of hierarchically arranged nodes, and each node includes data providing an indication as to whether the execution unit associated with the node should be executed locally or remotely.

5. The method of claim 4, further comprising rearranging the nodes of the run tree so that the nodes of the run tree that are designated for remote execution are grouped together in the run tree before those nodes of the run tree that are designated for local execution.

6. The method of claim 4, wherein processing the parse tree includes removing unnecessary nodes from the run tree.

7. The method of claim 1, wherein determining whether a local multidimensional calculation engine of the data access service is likely to perform the multidimensional operation more efficiently than the target multidimensional data source comprises comparing costs of performing the execution unit locally and remotely.

8. The method of claim 7, wherein comparing costs comprises comparing a current execution speed of a computing environment for the target multidimensional data source relative to a current execution speed of computing environment for the application data source as measure based on previous multidimensional calculations.

9. The method of claim 7, wherein comparing costs comprises comparing at least one of memory availability, memory consumption, or processor loading of a computing environment for the target multidimensional data source relative to a current execution speed of computing environment for the application data source as measure based on previous multidimensional calculations.

10. The method of claim 7, wherein comparing costs comprises determining a volume of data to be transferred to complete the operation locally within the data access service versus remotely with the target multidimensional data source.

11. The method of claim 1, wherein execution control document comprises an Extensible Markup Language (XML) document.

12. The method of claim 1, wherein the determination of whether to evaluate the query remotely or locally is made before executing the execution units.

13. The method of claim 12, further comprising re-evaluating by the data access service whether each of the execution units should be evaluated locally or remotely during execution of the execution units.

14. The method of claim 13, wherein re-evaluating whether each execution unit should be evaluated locally or remotely includes gathering, during processing of previous queries, heuristic information regarding the performance of the target multidimensional data source for the multidimensional operations specified by the execution units.

15. The method of claim 1, wherein the multidimensional query comprises a Multidimensional Expression (MDX) query.

16. A computing system comprising:

an enterprise software application to issue a multidimensional query in accordance with a multidimensional query language specifying a set of multidimensional operations;

a plurality of multidimensional data sources having different implementations of the set of multidimensional operations; and a data access service executing on a computing environment between the enterprise software application and the plurality of multidimensional data sources, wherein the data access service includes:

a multidimensional calculation engine;

a query parser to parse the multidimensional query into a plurality of execution units with the data access service, wherein the execution units specify multidimensional operations;

a performance store comprising an execution control document associated with a target one of the multidimensional data sources, wherein the execution control document includes a plurality of entries, wherein each entry comprises a set of 4-tuples, each 4-tuple comprising (1) data specifying a multidimensional operation supported by the multidimensional query language, (2) data providing an indication of whether a local multidimensional calculation engine of the data access service is capable of performing the specified multidimensional operation, (3) data providing an indication of whether a multidimensional calculation engine within the target multidimensional data source can perform the specified multidimensional operation, and (4) data providing a preference as to whether the specified multidimensional operation should be performed;

a query planner that identifies, within the execution control document references for executing the multidimensional operations of the execution units using the local multidimensional calculation engine of the data access service or calculation engines of the target multidimensional data source, and that designates each of the execution unit for either remote execution by the target one of the multidimensional data sources or locally by the data access service based on whether the implementation of the set of features of the target multidimensional data source supports any multidimensional operation specified by the execution unit and based on the identified preferences; and a query execution engine that executes each of the multidimensional execution units locally with a multidimensional calculation engine within the data access service or within the target data source based on the designation specified by the query planner and a determination whether the multidimensional calculation engine of the data access service is likely to locally perform the multidimensional operation more efficiently than the target multidimensional data source.

17. A computer-readable medium storage medium comprising executable instructions for causing a programmable processor to:

receive, from an enterprise software application, a query with a data access service positioned between the enterprise software application and a plurality of multidimensional data sources, wherein the query conforms to a multidimensional query language specifying a set of multidimensional operations, and wherein the multidimensional data sources are supplied by different vendors and provide different implementations of the set of multidimensional operations;

parse the multidimensional query into a plurality of execution units with the data access service, wherein the execution units specify multidimensional operations;

retrieve control information from an execution control document associated with a the target one of the multidimensional data sources, wherein the execution control document includes a plurality of entries, wherein each entry comprises a set of 4-tuples, each 4-tuple comprising (1) data specifying a multidimensional operation supported by the multidimensional query language, (2) data providing an indication of whether the local multidimensional calculation engine of the data access service is capable of performing the specified multidimensional operation, (3) data providing an indication of whether a multidimensional calculation engine within the target multidimensional data source can perform the specified multidimensional operation, and (4) data providing a preference as to whether the specified multidimensional operation should be performed;

identify, within the execution control document, preferences for executing the set of multidimensional operations of the execution units using the local multidimensional calculation engine of the data access service or calculation engines of the target multidimensional data source;

for each of the execution units:
(i) determine, with the data access service, whether the implementation of the set of features of the target multidimensional data source supports any multidimensional operation specified by the execution unit,
(ii) determine whether a local multidimensional calculation engine of the data access service is likely to perform the multidimensional operation more efficiently than the target multidimensional data source, and
(iii) designate the execution unit for either remote execution by the target one of the multidimensional data sources or locally by the data access service based on the determinations and the identified preferences; and execute each of the multidimensional execution units locally with a multidimensional calculation engine within the data access service or within the target data source based on the designation.

* * * * *